UNITED STATES PATENT OFFICE.

GERHARD NICOLAAS VIS, OF SCHWEIZERHALLE, NEAR BASLE, SWITZERLAND.

PROCESS OF PURIFYING BRINE.

SPECIFICATION forming part of Letters Patent No. 725,896, dated April 21, 1903.

Application filed July 29, 1901. Serial No. 70,141. (No specimens.)

*To all whom it may concern:*

Be it known that I, GERHARD NICOLAAS VIS, a subject of the Queen of the Netherlands, residing at the town of Schweizerhalle, near Basle, Switzerland, have invented a new and useful Process for the Purification of Brine Containing Salts of Calcium; and I do hereby declare that the following is a full, clear, and exact description of the same.

This invention relates to the purification of brine, especially from calcium compounds; and its main object is to obtain this in an efficient manner at a low cost.

To this end the present invention resides in the process hereinafter described, which consists of a new combination of known chemical reactions resulting in the regeneration of the purifying agent for reuse in the purification of a fresh quantity of brine.

The purifying step is based on the known fact that magnesium carbonate and calcium compounds (sulfate, chlorid, and others) react with each other by exchanging their acid components, with the effect that calcium carbonate is caused to separate out while the magnesium salts formed enter into solution. The regenerating step is based upon the transformation of magnesium compounds into magnesium hydroxid by the action of slaked lime or calcium hydroxid and the treatment of the magnesium hydroxid thus formed with carbonic acid.

In the first application of my new process artificially-prepared magnesium carbonate should be used, because the natural forms of this compound—such as dolomite, magnesite, and the like—have proved to be very slow in reacting with calcium compounds in the presence of sodium chlorid. As most of the natural brines contain magnesium compounds (sulfate, chlorid) the mother-lyes obtained therefrom may be utilized for preparing the magnesium carbonate required by means of any one of the known processes.

In carrying out the present invention the percentage of calcium present in the brine in the form of sulfate and halogen compounds is first determined by analysis, and then a corresponding quantity of magnesium carbonate, preferably artificially-prepared magnesium carbonate, is mixed with the brine. It is, however, preferred to apply a slight excess of this reagent. After deposition the precipitate is separated by filtration or decantation from the brine, and the latter is evaporated to separate out sodium chlorid, which is finally separated from the mother-lye. The latter contains all the magnesum salts formed and dissolved in the step of removing the calcium from the brine. A percentage of slaked lime or calcium hydroxid corresponding to the percentage of magnesium compounds found in the mother-lye is mixed with the latter, whereby the magnesium compounds present are converted into magnesium hydroxid which precipitates together with more or less of the calcium sulfate formed from the magnesium sulfate, according as the mother-lye contained a larger or smaller percentage of sulfates of alkaline metals, such as sodium and potassium sulfates. The liquor is separated—for instance, by filtering—from the resulted precipitate, and the latter is treated in known manner with carbonic acid—for instance, in the form of furnace-gases—whereby the magnesium hydroxid is transformed into carbonate of magnesium. The thus-regenerated magnesium carbonate is reused for purifying a fresh quantity of brine, and the resulting mother-lye treated as described to reobtain magnesium carbonate for reuse in a subsequent operation. In this manner the purifying agent is not wasted, but can be used over and over again. Moreover, the slaked lime necessary in my process can be produced from the calcium carbonate precipitated in the first step of my new process.

Before treating the magnesium hydroxid precipitate with carbonic acid I prefer to wash said precipitate with water in order to dissolve therefrom the greater part of the calcium sulfate.

What I claim as my invention is—

The process of purifying brine which consists in adding to the brine magnesium carbonate in a quantity sufficient to transform the calcium compounds present into calcium carbonate, separating the brine from the precipitate, evaporating the brine, removing the separated-out sodium chlorid from the mother-lye, mixing the mother-lye with slaked lime, separating the liquor from the precipitate, washing the precipitate with water, treating the washed precipitate with carbonic acid, and reusing the thus-regenerated magnesium carbonate for purifying a fresh quantity of brine, substantially as and for the purposes stated.

In testimony whereof I have hereunto set my hand in presence of two subscribing witnesses.

GERHARD NICOLAAS VIS.

Witnesses:
GEORGE GIFFORD,
JOHN G. PLATNER.